United States Patent [19]

Mignien

[11] 4,387,957
[45] Jun. 14, 1983

[54] CONNECTOR FOR OPTICAL FIBRES

[75] Inventor: Georges Mignien, Meyzieu, France

[73] Assignee: Societe Anonyme dite: Compagnie Lyonnaise de Trandmissions Optiques, Clichy, France

[21] Appl. No.: 205,546

[22] Filed: Nov. 10, 1980

[30] Foreign Application Priority Data

Nov. 8, 1979 [FR] France ................................ 79 27543

[51] Int. Cl.$^3$ .............................................. G02B 7/26
[52] U.S. Cl. ................................................. 350/96.21
[58] Field of Search ........................... 350/96.21, 96.22

[56] References Cited

U.S. PATENT DOCUMENTS

| | | | |
|---|---|---|---|
| 3,902,785 | 9/1975 | Matthews | 350/96.21 |
| 4,015,894 | 4/1977 | Rocton | 350/96.21 |
| 4,061,416 | 12/1977 | Stewart | 350/96.21 |
| 4,132,461 | 1/1979 | Jacques et al. | 350/96.21 X |

FOREIGN PATENT DOCUMENTS 2758964  7/1979  Fed. Rep. of Germany ... 350/96.21

*Primary Examiner*—Paul L. Gensler
*Attorney, Agent, or Firm*—Sughrue, Mion, Zinn, Macpeak, and Seas

[57] ABSTRACT

A connector for optical fibres, said connector including two groups of three cylindrical support rods, 13A, 13B, 13C, 14A, 14B, 14C, all of same diameter and guide means to keep these two groups of three rods side by side and in contact with each other so as to provide a central passage to house the optical fibres. The guide means include a group of three or four bearings held coaxially with one or two central bearings 20A, 20B, surrounding the two groups of rods on either side of their plane of contact 17 with very little play and with one end bearing 18, 19 surrounding each group of three rods with the same or a slightly greater play at a point distant from the plane of contact. Application to optical fibre transmission lines.

4 Claims, 5 Drawing Figures

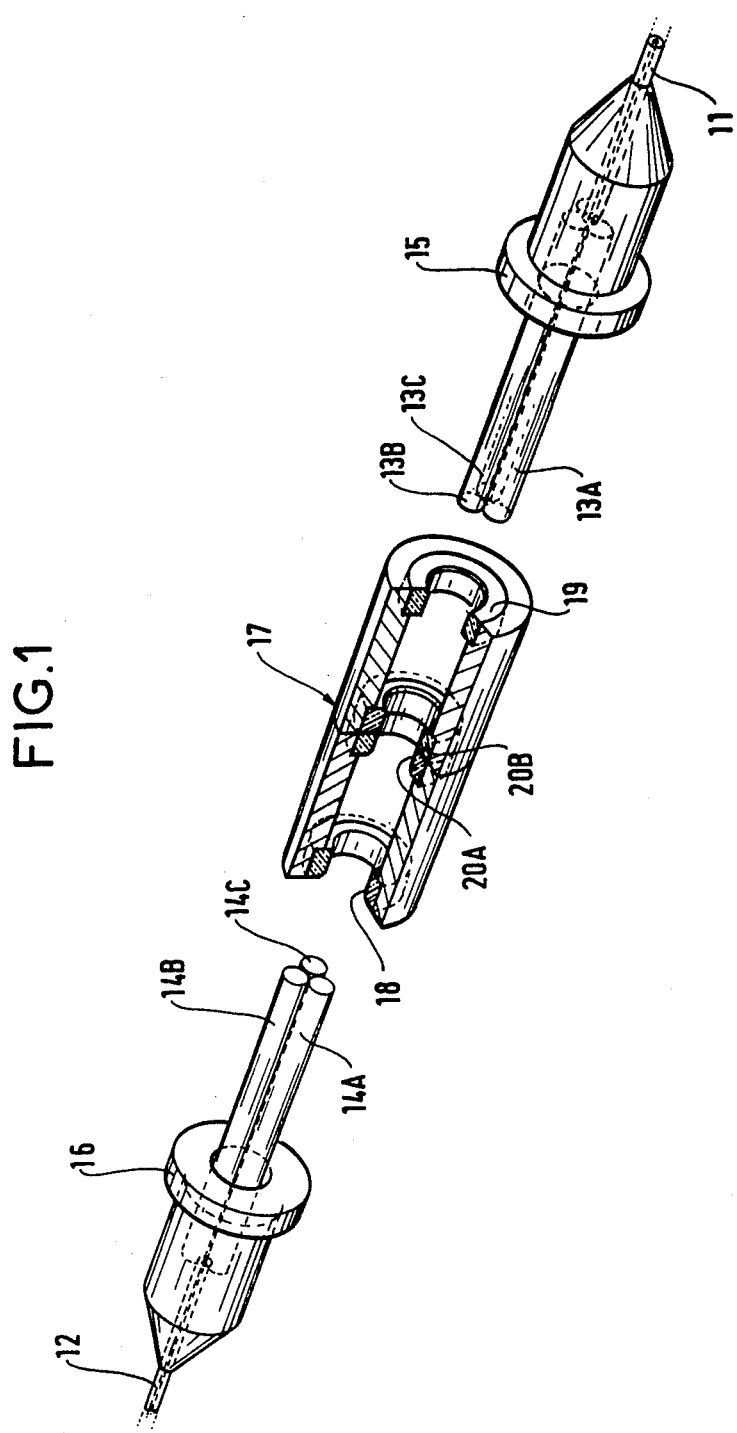

CONNECTOR FOR OPTICAL FIBRES

The present invention relates to a connector for optical fibres, said connector including two groups of three cylindrical support rods all of same diameter and guide means to keep these two groups of three rods side by side and in contact with each other so as to provide a central passage to house the optical fibres, said passage being delimited by the adjacent side surfaces of the three rods.

BACKGROUND OF THE INVENTION

U.S. Pat. No. 4,142,777 of Mar. 6, 1979, describes a connector in which each of the groups of three support rods is prior assembled to form a half connector and the groups of rods are brought face to face in machined V-shaped grooves in which they are held by means of adjustable clamping shoes.

Although it accurately centres the two optical fibres relative to each other, the connector has some disadvantages. The V-shaped guide grooves are difficult to machine and consequently they are expensive, and to ensure accurate adjustment of the clamping shoes, it is necessary to adjust them in a laboratory. Further, the connector does not rotate symmetrically and therefore gives rise to angular positioning difficulties on assembly.

Preferred embodiments of the present invention provide a connector which is easier to manufacture, simpler in structure, allows the optical fibre axes to be aligned even on a work site, and rotates symmetrically.

SUMMARY OF THE INVENTION

The improvement of the present invention comprises guide means including a group of three bearings which are held coaxially with at least one central bearing surrounding the two groups of three rods on either side of their plane of contact with very little play, and with one end bearing surrounding each group of three rods with the same or a slightly greater play at a position distant from said plane of contact.

The present invention also preferably has at least one of the following features:

The bearings are made of a harder material than the support rods and have greater resistance to wear.

The bearings are fitted in housings in a coaxial sleeve, the central bearing being in the plane of symmetry of the sleeve and the end bearings being located at the ends of the sleeve.

Said coaxial sleeve consists of two symmetrical halves forced fitted in an outer clamping sleeve.

There are four bearings: one at each of the ends of the coaxial sleeve as a whole and two at its middle.

Said coaxial sleeve consists of two symmetrical end portions the outer end of each end portion including a housing for a bearing and for an intermediate component whose inside bore diameter is larger than that of the bores of the end parts, and housing forming a housing for one or two central bearings.

BRIEF DESCRIPTION OF THE DRAWINGS

Three optical fibre connectors in accordance with the invention are described hereinafter by way of example with reference to the accompanying drawings in which:

FIG. 1 is a diagrammatic exploded perspective view, of a four-bearing connector sleeve, with the sleeve being shown partially cut away.

DESCRIPTION OF PREFERRED EMBODIMENTS

In FIG. 1, the ends of two fibres 11 and 12 which are to be connected are each secured between the rods of respective sets of three cylindrical steel rods of identical diameters namely; rods 13A, 13B, 13C and rods 14A, 14B, 14C. These sets of cylindrical rods are themselves inserted in retaining rings 15,16 and secured by surface moulding with an epoxy resin in a suitable mould; two identical half connectors are thus formed. The adjacent end surfaces of these half connectors are carefully trimmed flush with the end surface of the corresponding fibre so as to limit loss of light when the half connectors are assembled.

Said half connectors are assembled by engaging them in a cylindrical connection sleeve 17 which has four guide bearings 18, 20A, 20B, 19 inside made of ruby. These bearings are strictly identical in pairs since they are pierced simultaneously in groups of two and finished by grinding so that the two adjacent central bearings 20A and 20B have the same inside diameter which is only one or two microns larger than the diameter of the circle circumscribing the three cylindrical rods of each of the half connectors, the end bearings 18 and 19 also have the same diameter as each other, but it is about 6 microns larger than that of the central bearings.

For example, in one particular embodiment, the central bearings have a bore diameter of 1.772 mm while the end bearings have a bore diameter of 1.778 mm.

Figure 2A:
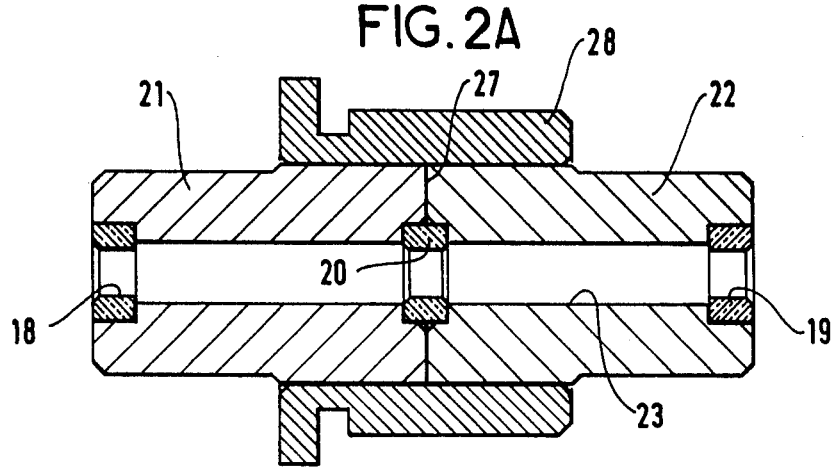
FIG. 2A illustrates an axial cross-section of a three-bearing sleeve.

It is also possible to replace the two central bearings which are placed against each other by a single bearing, but it would be difficult to form a sufficiently long guide bearing with a single bearing surface. It is obvious that for convenience sake when machining, it is preferable to form a sleeve in several parts. Such a sleeve, illustrated in FIG. 2A, is formed by two half sleeves 21 and 22 which are symmetrical about their plane of contact 27, and whose ends have recesses of larger diameter than that of their common bore 23. The end bearings 18, 19 and the central bearing 20 are very tightly fitted into said recesses. These two half sleeves are kept coaxial when applied against each other by an outer sleeve 28 into whose bore they are force fitted.

Figure 2B:
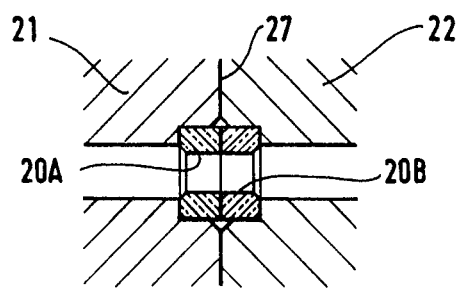
FIG. 2B illustrates the intermediate portion of a sleeve which is analogous to that in FIG. 2A but includes two adjacent bearings instead of one in said intermediate portion.

In the variant whose central portion is illustrated in FIG. 2B, there are two adjacent central bearings 20A, 20B instead of the single bearing 20 of FIG. 2A.

Figure 3:
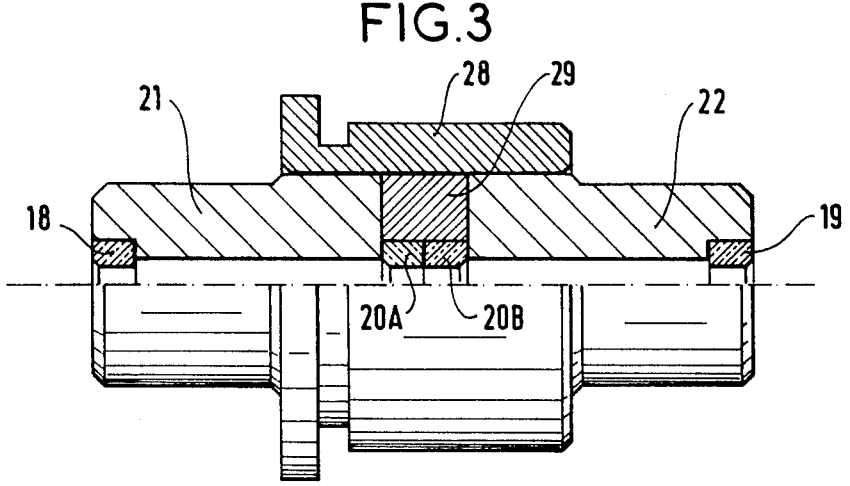
FIG. 3 illustrates an axial half cut away elevation of a sleeve in three portions.

The three-part bearing illustrated in FIG. 3 includes two end components 21 and 22 and an intermediate component 29. The inner bore of said intermediate component is of larger diameter than the components 21 and 22 and serves as a housing for the two central bearings 20A, 20B; the assembly formed by the three components 21, 29, 22 is force fitted into the bore of an outer sleeve 28.

Figure 4:
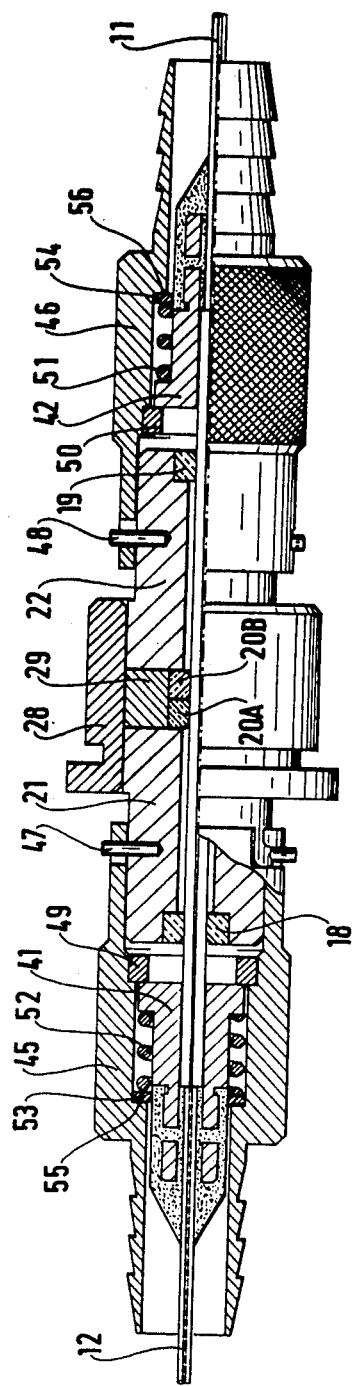
FIG. 4 illustrates a general axial cut away elevation of a connector which includes a sleeve analogous to that in FIG. 3.

FIG. 4 illustrates the assembly formed by the components of the connector all installed and connected together. It also illustrates the end pieces 41 and 42 surface moulded round the fibres 11, 12 and round the fibre support rods. The inner guide sleeve includes the two end components 21 and 22 and the intermediate component 29. These three components surround the four coaxial bearings 18, 20A, 20B and 19. The three portions of the guide sleeve are force fitted into the outer sleeve 28 so as to constitute an inseparable unit. Two caps 45 and 46 are fixed on either side of the inner sleeve by means of a bayonet system which uses two retaining studs 47 and 48 driven into the body of the sleeve and two springs 51 and 52. These caps keep the ends of the end pieces 41 and 42 pressed against each other by means of two circular rings 49 and 50. Two washers 53 and 54 made of a plastic material of low friction coefficient (i.e. polytetrafluoroethylene) are inserted between the ends of the springs 51, 52 and the inner shoulders 55, 56 of the caps to allow said caps to rotate relatively to the end pieces and thus to provide angular uncoupling of the end pieces from the sleeves for correct and easy positioning.

Although the embodiments of connectors just described with reference to the figures appear preferable, it will be understood that various modifications can be made thereto without going beyond the scope of the invention, it being possible to replace some of their components by others which are capable of performing an analogous technical function. In particular, the bayonet snap fitting of the sleeves can be replaced by fixing with ferrules and nuts or by split rings or by any other equivalent means. The material of the bearings can be any hard material other than ruby and capable of withstanding wear.

The invention applies in particular to optical fibre data transmission lines.

I claim:

1. A connector for optical fibres, said connector including two groups of three cylindrical support rods all of the same diameter and guide means to keep said two groups of three rods side by side and in contact with each other so as to provide a central passage to house the optical fibres, said passage being delimited by the adjacent side surfaces of the three rods, the improvement wherein said guide means includes a group of at least three bearings which are held coaxially including two end bearings, at least one of said three bearings being sized to and surrounding the two groups of three rods on either side of their plane of contact with very little play and forming a central bearing, said end bearings surrounding each group of three rods with the same or a slightly greater play, said bearings being fitted in housings in a coaxial sleeve, the central bearing being in the plane of symmetry of the sleeve and the end bearings being located at the ends of the sleeve, and wherein said coaxial sleeve consists of two symmetrical end portions having outer ends of each end portion forming a housing for a respective end bearing, and an intermediate sleeve component whose inside bore diameter is larger than that of the bores of the end portions, said intermediate component housing said central bearings.

2. A connector according to claim 1, wherein the bearings are made of a harder material than the support rods and have greater resistance to wear.

3. A connector according to claim 1, wherein said coaxial sleeve consists of two symmetrical halves constituting said symmetrical end portions and being force fitted in an outer clamping sleeve against opposite ends of said intermediate sleeve component.

4. A connector according to claim 3, wherein said at least three bearings comprise four bearings, one at each of the symmetrical end portions of the coaxial sleeve and two at its middle within the enlarged bore of said intermediate sleeve component.

* * * * *